R. B. PAINTON.
STEAM AND AIR PIPE COUPLING FOR CARS.
APPLICATION FILED JUNE 11, 1909.
961,638.
Patented June 14, 1910.
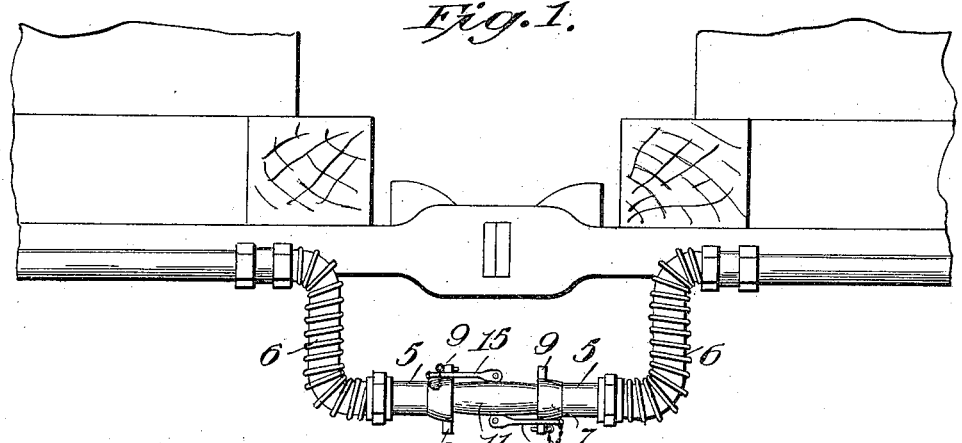
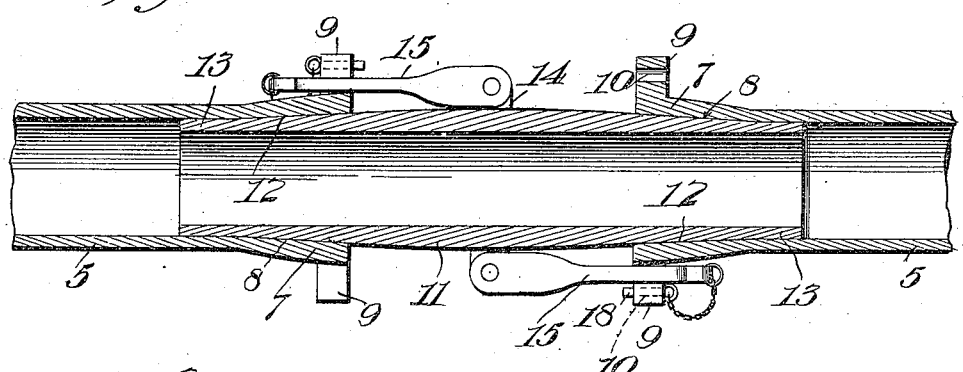
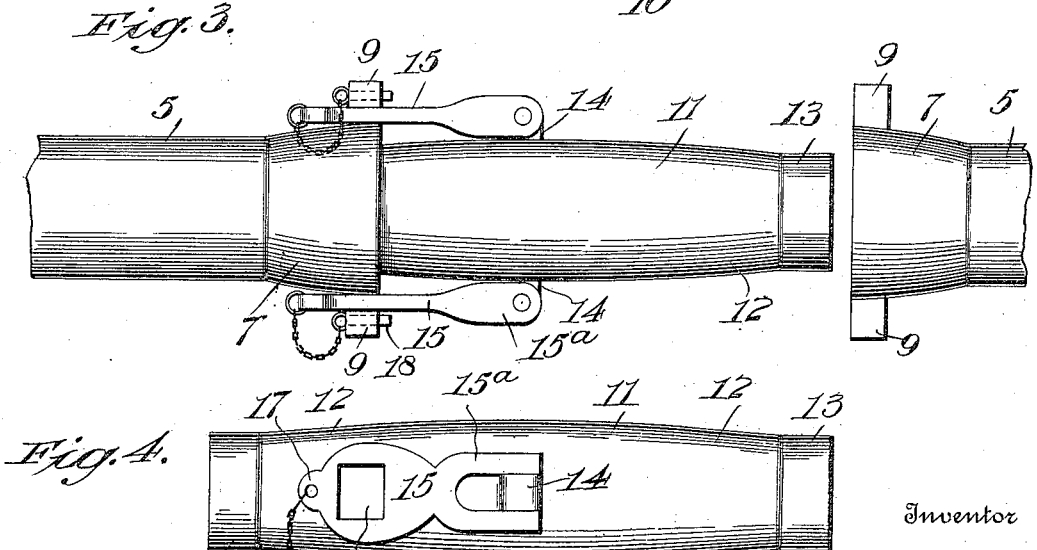
Inventor
Richard B. Painton

UNITED STATES PATENT OFFICE.

RICHARD BENJAMIN PAINTON, OF WILLIAMSPORT, PENNSYLVANIA.

STEAM AND AIR PIPE COUPLING FOR CARS.

961,638.  Specification of Letters Patent. Patented June 14, 1910.

Application filed June 11, 1909. Serial No. 501,526.

*To all whom it may concern:*

Be it known that I, RICHARD B. PAINTON, a citizen of the United States, residing at Williamsport, in the county of Lycoming and State of Pennsylvania, have invented certain new and useful Improvements in Steam and Air Pipe Couplings for Cars, of which the following is a specification.

This invention relates to pipe couplings of the type designed for the connection of steam and air pipes of railway cars, and has special reference to a simple and practical coupling of this character designed to obviate the objections to the ordinary types of brake and steam hose couplings, while at the same time, establishing a more direct line of communication between the pipes on the separate cars than is possible by the use of the Westinghouse and similar gasketed types of brake and steam hose couplings.

To this end, the invention contemplates a steam and air pipe coupling embodying a minimum number of parts, entirely dispensing with the use of the gasket feature which is necessarily part of the ordinary brake and steam pipe hose coupling, and which may be interchangeably employed therewith, said coupling being such that it may be readily substituted for the ordinary type of coupling and said ordinary type of coupling may be readily substituted for the present invention in order that proper connections may be made where two cars come together having respectively different coupling sections thereon.

A further object of the invention is to provide a coupling wherein the parts may be placed in coupled and uncoupled relation with the greatest facility.

With these and other objects in view, which will more readily appear as the nature of the invention is better understood, the same consists in the novel construction, combination and arrangement of parts, which will be hereinafter more fully described, illustrated and claimed.

The essential features of the invention involved in carrying out the above objects, are necessarily susceptible to structural change, without departing from the spirit or scope of the invention, but a preferred embodiment thereof is shown in the accompanying drawings, wherein:—

Figure 1 is a side elevation of the coupling, showing the parts connected and indicating in dotted lines how an ordinary Westinghouse coupling section may be substituted for one of the present sections. Fig. 2 is a longitudinal sectional view therethrough on an enlarged scale. Fig. 3 is a similar view, but illustrating the parts separated. Fig. 4 is a side elevation of the coupling tube.

Similar reference numerals designate corresponding parts in all the figures of the drawings.

In the embodiment disclosed, pipe terminal members 5 are employed, which are in all respects duplicates, and are mounted upon hose sections 6 preferably of the armored type, which sections are connected with the usual pipe system of the car, as will be understood. The terminal members 5 have their free ends enlarged and preferably reinforced, as shown at 7, and said ends have inwardly tapered sockets 8 terminating at their inner ends in straight bores, the tapering portions forming joint seats for the coupling tube. These terminal members are also provided with opposite outstanding ears or lugs 9 having openings 10 therethrough.

For the purpose of connecting the two terminal members of adjacent coupled cars, a coupling tube 11 is employed having conical or tapered portions 12 at both sides of its center for wedging engagement with the tapered joint seats or mouths of the sockets, said tube also being formed with straight necked terminal extension portions 13 projecting beyond the planes of the conical portions and arranged to extend into the straight bored portions of the terminal members for guiding and air sealing purposes. The coupling tube furthermore has central oppositely extending ears or lugs 14, to which are pivoted the clevises 15ª at one end of the holding or fastening links 15, said links being arranged to swing longitudinally of the tube in both directions and having openings 16 therethrough that are arranged to engage over the ears of either terminal member 5. These links preferably have finger extensions 17, by which they may be readily operated, and furthermore when they are engaged with the ears, they can be effectively fastened thereto by pins 18 that are passed through the openings 10.

In using the device, when two cars carrying the terminal members are coupled, said members receive the ends of the coupling tube, which fits snugly into the sockets, forming air and liquid tight joints. One of the links 15 is engaged and fastened over one of the ears of one of the terminal members, and the other is in like manner engaged and fastened over the other member, as illustrated in Figs. 1 and 2. The parts are thus effectively held together, and a direct effective coupling is thus secured, without the necessity of gaskets or other objectionable packing. When it is desired to uncouple a car, one of the links is disengaged from its member, and is swung over and engaged with the ear of the other member, whereupon upon the separation of the car, it will be obvious that the coupling tube will disengage itself from the freed member, but will be effectively fastened to the other, as shown in Fig. 3.

A highly effective and exceedingly simple coupling is thus produced, and it will be obvious that the same can be cheaply manufactured, and readily substituted for the couplings now ordinarily used. Furthermore by reference to Fig. 1, it will be noted that this form of coupling can be readily interchanged with the ordinary Westinghouse or like coupling, as one section or the other can be readily detached and replaced by a section, which will coöperate with the abutting section.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

In connection with the above described structure, it may be stated that the pivot pins, by means of which the links 15 are connected to the projections 14, are made of sufficiently weak material that will permit them to break in case of undue strain upon the coupling, should the cars separate from any reason, without the coupling elements being disconnected. It will be obvious that this will avoid more serious injury to other parts.

Having thus fully described my invention, what I claim as new, and desire to secure by Letters Patent, is:—

1. A steam and air pipe coupling, comprising pipe terminal members having mouths, and each having oppositely disposed retaining elements, a coupling tube having ends that detachably engage in the mouths, a pair of swinging holding links pivoted to the central portion of the tube on diametrically opposite sides of the same and on axes that are fixed with relation to the tube, each link being capable of swinging in opposite directions and into detachable interlocking relation with one of the retaining elements of each terminal member, and means for retaining the holding links in said interlocking relation with the different retaining elements.

2. A steam and air pipe coupling, comprising pipe terminal members having flared mouths, a coupling tube having tapered end portions that detachably fit into the mouths, said terminal members each having oppositely extending lugs, holding links, each pivotally mounted at one end on a fixed axis on the central portion of the coupling tube and capable of swinging in opposite directions, the other ends of said links having sockets which are engaged by the lugs of either terminal member, and means for securing the lugs in said sockets.

3. In a steam and air pipe coupling, the combination with flexible hose members, of oppositely arranged socket members secured to said hose members and each of which socket members has a flaring receiving mouth provided therein with a tapered joint seat, a removable coupling tube having conical or tapering portions at both sides of its center for wedging engagement with the mouth of the socket members, said tube also being formed with straight necked extensions arranged to extend into the straight portions of the socket members for guiding and air sealing purposes, and holding elements having a connection with said coupling tube and adapted to be connected with either or both of said socket members.

In testimony whereof I hereunto affix my signature in the presence of two witnesses.

RICHARD BENJAMIN PAINTON.

Witnesses:
R. C. BRADDOCK,
M. H. YATES.